(12) United States Patent
Buehler et al.

(10) Patent No.: US 10,949,187 B2
(45) Date of Patent: Mar. 16, 2021

(54) ADJUSTED CONSOLIDATED DIGITAL EXPERIENCE

(71) Applicant: INTERNATIONAL BUSINESS MACHINES CORPORATION, Armonk, NY (US)

(72) Inventors: Dieter Buehler, Tuebingen (DE); Thomas Stober, Herrenberg (DE); Uwe K. Hansmann, Tuebingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/363,130

(22) Filed: Mar. 25, 2019

(65) Prior Publication Data

US 2020/0310770 A1      Oct. 1, 2020

(51) Int. Cl.
   *G06F 8/61*      (2018.01)
   *G06F 9/445*     (2018.01)

(52) U.S. Cl.
   CPC .............. *G06F 8/61* (2013.01); *G06F 9/445* (2013.01)

(58) Field of Classification Search
   CPC ................................. G06F 8/61; G06F 9/445
   See application file for complete search history.

(56) References Cited

U.S. PATENT DOCUMENTS

| 9,374,423 | B2 | 6/2016 | Crosbie et al. |
| 10,180,832 | B2* | 1/2019 | Stantchev ................ G06F 8/61 |
| 2015/0099495 | A1* | 4/2015 | Crosbie ................. B60W 50/14 |
| | | | 455/414.3 |
| 2017/0213520 | A1* | 7/2017 | Kim ......................... G06F 3/14 |
| 2018/0241865 | A1* | 8/2018 | Schee .................... G06F 1/1632 |
| 2018/0316939 | A1* | 11/2018 | Todd ................... H04N 21/6587 |

OTHER PUBLICATIONS

A. Walker, "14 Tech Companies Embracing Container Technology", blog.g2crowd.com, Dec. 19, 2017, pp. 12.

* cited by examiner

*Primary Examiner* — Wei Y Zhen
*Assistant Examiner* — Amir Soltanzadeh
(74) *Attorney, Agent, or Firm* — Janaki K. Davda; Konrad Raynes Davda & Victor LLP

(57) ABSTRACT

Provided are techniques for an adjusted consolidated digital experience. A contributed service is installed in a container. The contributed service is executed in a first runtime environment to display a first output on a display. A native service is executed in a second runtime environment to display a second output in the display with the first output.

20 Claims, 7 Drawing Sheets

```
{
    "id": "0234238a1-3240-13432444de-234242362d69"
    "timestamp": "2018-02-28 12:45:10.952"
    "source": {
    "uuid": "0d0878a1-1bf0-11e8-89de-525400362d69",
    "name": "Maps Application",
    "version": "4.8.1",
    "provider": "Map Provider"
    }
    "event": {
    "type": "NewTargetDestination",
    "data": {
    "latitude": "46.627792",
    "longitude": "4.439844",
    "country": "Germany",
    "City": "Tübingen"
    }
    }
}
```

ADJUSTED CONSOLIDATED DIGITAL EXPERIENCE

BACKGROUND

1. Field of the Invention

Embodiments of the invention relate to an adjusted consolidated digital experience. In certain embodiments, different services from different smart devices are consolidated to provide the consolidated digital experience.

2. Description of the Related Art

Today, many users have a smart phone (i.e., a type of smart device), which is carried around every day. In addition, there are an increasing number of other smart devices, such as smart whiteboards in meeting rooms or smart dashboards in cars, which provide their own environment, similar to smart phones or tablets. Today, these smart devices have their own services (e.g., applications or "apps"), but are not connected to the apps and data installed on other smart devices (e.g., a smart dashboard of a car may not be connected to a smart phone or may be connected for limited capability, such as accessing the same remote cloud services to store, share, and retrieve data).

A digital experience may be described as, for example, what a device is displaying to one or more users.

One way to get a digital experience in a car is to connect the smart phone to the built-in display (e.g., a display screen). This provides a user with access to services from the smart phone, which are displayed on that car's display.

Similar concepts exist to connect to a shared whiteboard in a meeting room.

In any case, in a conventional system, there is a one to one relationship with one smart phone connecting to one other smart device, which may either act as an external display of a service from the smart phone, on the smart device or may access common data from, for example, a cloud storage or service.

SUMMARY

In accordance with embodiments, a computer-implemented method is provided for an adjusted consolidated digital experience. The computer-implemented method comprises operations. A contributed service is installed in a container. The contributed service is executed in a first runtime environment to display a first output on a display. A native service is executed in a second runtime environment to display a second output in the display with the first output.

In accordance with other embodiments, a computer program product is provided for an adjusted consolidated digital experience. The computer program product comprising a computer readable storage medium having program code embodied therewith, the program code executable by at least one processor to perform operations. A contributed service is installed in a container. The contributed service is executed in a first runtime environment to display a first output on a display. A native service is executed in a second runtime environment to display a second output in the display with the first output.

In yet other embodiments, a computer system is provided for an adjusted consolidated digital experience. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A contributed service is installed in a container. The contributed service is executed in a first runtime environment to display a first output on a display. A native service is executed in a second runtime environment to display a second output in the display with the first output.

BRIEF DESCRIPTION OF THE SEVERAL VIEWS OF THE DRAWINGS

Referring now to the drawings in which like reference numbers represent corresponding parts throughout:

FIG. 2 illustrates a data structure for an implementation of an event broker for a secure event mechanism to share data across containers in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide a digital experience that allows services (e.g., applications, such as navigation applications, drawing applications, etc.) from two or more smart devices (e.g., a smart device of a vehicle and a smart phone, a smart whiteboard and two additional smart phones, etc.) to contribute to another smart device. A vehicle may be a car, a plane, a bus, a train, etc.

Embodiments offer an adjusted consolidated digital experience on a receiving smart device (e.g., a built-in smart device, such as, a smart dashboard of a vehicle or a smart whiteboard in a meeting room), by incorporating the services of one or more smart devices (e.g., accessible in the vehicle or the meeting room) with the native services of the receiving smart device. In addition, embodiments also allow the services coming from different smart devices to interact within runtime environments provided by the receiving smart device. Each runtime environment is shared and secure. A runtime environment may be described as the operating system of a smart device or as the state of the smart device when a service is running (i.e., being executed by the operating system).

Figure 1:
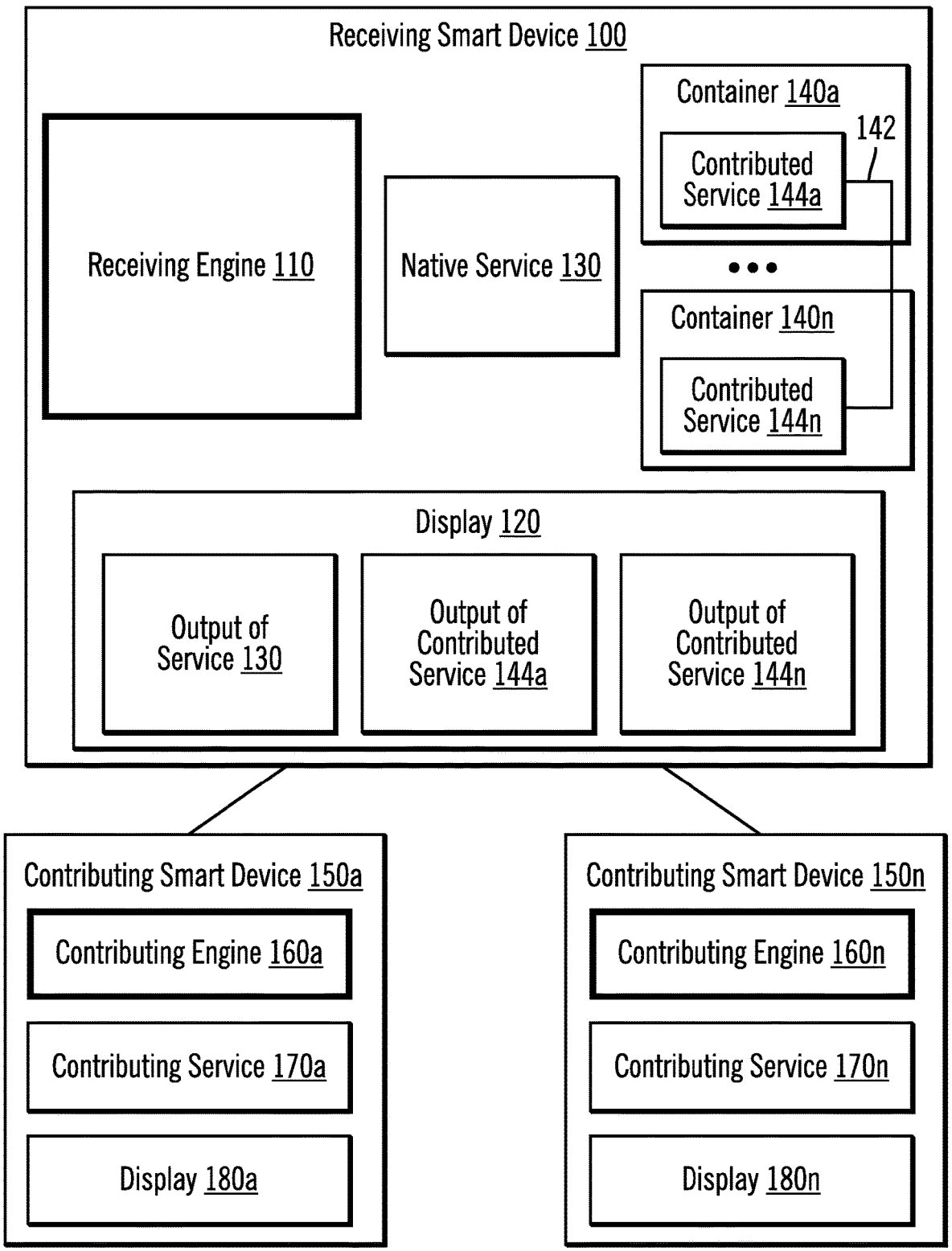
FIG. 1 illustrates, in a block diagram, a computing environment in accordance with certain embodiments.

FIG. 1 illustrates, in a block diagram, a computing environment in accordance with certain embodiments. A receiving smart device 100 (e.g., a smart dashboard or a smart whiteboard) is able to communicate with one or more contributing smart devices 150a . . . 150n.

The receiving smart device 100 includes a receiving engine 110, a display 120 (e.g., a display screen or Graphical User Interface (GUI)), at least one native service 130, and containers 140a . . . 140n.

Each contributing smart device 150a . . . 150n includes a contributing engine 160a . . . 160n, at least one contributing service 170a . . . 170n, and a display 180a . . . 180n.

The receiving engine 100 receives service code (e.g., application code) and data associated with each contributing service 170a . . . 170n from each contributing engine 160a . . . 160n and stores these as contributed services 144a . . . 144n in one of the containers 140a . . . 140n. For example, container 140a stores contributed service 144a, and container 140n stores contributed service 144n in container 140n. In certain embodiments, the contributed service 144a . . . 144n includes a subset of the functionality of the contributing service 170a . . . 170n (e.g., due to licensing, etc.).

The receiving engine 100 executes the native service 130 to display output of the native service 130 in the display 120 of the receiving smart device, executes the contributed service 144a in the container 140a to display output of the contributed service 144a in the display 120 of the receiving smart device, and executes the contributed service 144n in the container 140n to display output of the contributed service 144n in the display 120 of the receiving smart device. In this manner, the display 120 of the receiving smart device 100 may be adjusted to display the output from the contributed services 144a, 144n. Although the outputs of the native service 130 and the contributed services 144a, 144n are shown, in other embodiments, any combination of outputs from two or more services (native or contributed) may be shown in the display 120.

In certain embodiments, the receiving smart device 100 (e.g., a build-in device) offers a secure container runtime environment to execute the contributed services 144a . . . 144n.

The receiving smart device 100 offers a number of containers 140a . . . 140n. The contributing engines 160a . . . 160n of the contributing smart devices 150a . . . 150n may contribute services to be installed in the containers 140a . . . 140n, but the receiving engine 110 of the receiving smart device 100 may accept or reject requests from the contributing engines 160a . . . 160n to contribute services. For example, the receiving engine 110 may take a predetermined number of services in total across the contributing smart devices 150a . . . 150n, may take a predetermined number of services per contributing smart device 150a . . . 150n, may exclude specific services due to licensing issues, may exclude specific services that may include viruses or inappropriate content, may exclude specific services that use too many resources on the receiving smart device 100 (e.g., use too much memory), etc.

A container 140a . . . 140n may be described as a unit of software that receives the contributed service 144a . . . 144n and provides a runtime environment so that the contributed service 144a . . . 144n executes in the receiving smart device 100. In certain embodiments, each container 140a . . . 140n may be described as a standalone, executable package of software that includes code, runtime, system tools, system libraries, settings, data, and Application Programming Interfaces (APIs), to execute the contributed service 144a . . . 144n. The use of the container 140a . . . 140n allows for that unit of software to be transferred from the contributing smart device 150a . . . 150n to the receiving smart device 100. A container 140a . . . 140n may also be described as a sandbox environment that isolates that contributed service 144a . . . 144n.

In certain embodiments, the contributing service 170a . . . 170n is transferred and is stored as a contributed service 144a . . . 144n that uses an existing container 140a . . . 140n in the receiving smart device 100 to execute the contributed service 144a . . . 144n. In such embodiments, the container 140a . . . 140n provides the runtime environment and also ensures the isolation between the contributed services. In alternative embodiments, the whole container may get transferred.

In certain embodiments, there may be a different number of contributing smart devices to containers. For example, if there are two smart devices and two contributing services from each smart device, then there may be four containers to store four contributed services.

With embodiments, the contributed services 144a . . . 144n may be loaded into the containers 140a . . . 140n by different users of the different contributing smart devices 150a . . . 150n. This allows users to work better.

In addition to the contributing services 170a . . . 170n, the contributing smart devices may also contribute service content (e.g., music playlists, maps, presentation materials, etc.).

Also, each container 140a . . . 140n provides isolation and security because the containers 140a . . . 140n are not allowed to access service information (e.g., code, runtime, system tools, system libraries, settings, data, APIs) of other containers 140a . . . 140n. The receiving engine 110 or the receiving smart device 100 provides a communication channel 142 for securely exchanging events (e.g., semantic events) between the first contributed service 144a in the first container 140a and the second contributed service 144n in the second container 140n for cross container communication. An event may be described representing an interaction with a GUI item. For example, an ActionEvent is an event fired when a button or menu item is selected.

The communication channel 142 may also be described as a messaging system. In certain embodiments, a secure eventing mechanism of the receiving smart device 100 provides cross container communication securely.

The secure eventing mechanism allows the services that are loaded into the different containers 140a . . . 140n to communicate with each other.

FIG. 2 illustrates data structure 200 for an implementation of an event broker for a secure event mechanism to share data across containers 140a . . . 140n in accordance with certain embodiments. In FIG. 2, the service is a "Map Application". A contributing engine 160a may send this data structure 200 to the receiving engine 110 to display the map in the display 120. For example, the receiving engine 110 executes the "Maps Application", and the "Maps Application" uses the data structure 200 to load the map and routing based on the contained event "NewTargetDestination"

Embodiments allow for the following example scenario. A first user and a second user commute together in a shared vehicle. The first user loads a first contributed service for navigation into the smart dashboard runtime environment of the vehicle (which is a receiving smart device 100). The first contributed service guides the driver by providing navigation information, which is displayed on a display of the smart dashboard. The second user has a new, second contributed service providing information about the position of stars in the sky. The second user loads the second contributed service into the smart dashboard runtime environment of the vehicle. The first contributed service and the second contributed service are able to exchange information, such as location, directions, etc. Then, the display of the smart dashboard displays a pointer to a certain star (coming from the second contributed service), as well as, a point of interest or the routing to the new destination (coming from the first contributed service).

Figure 3:
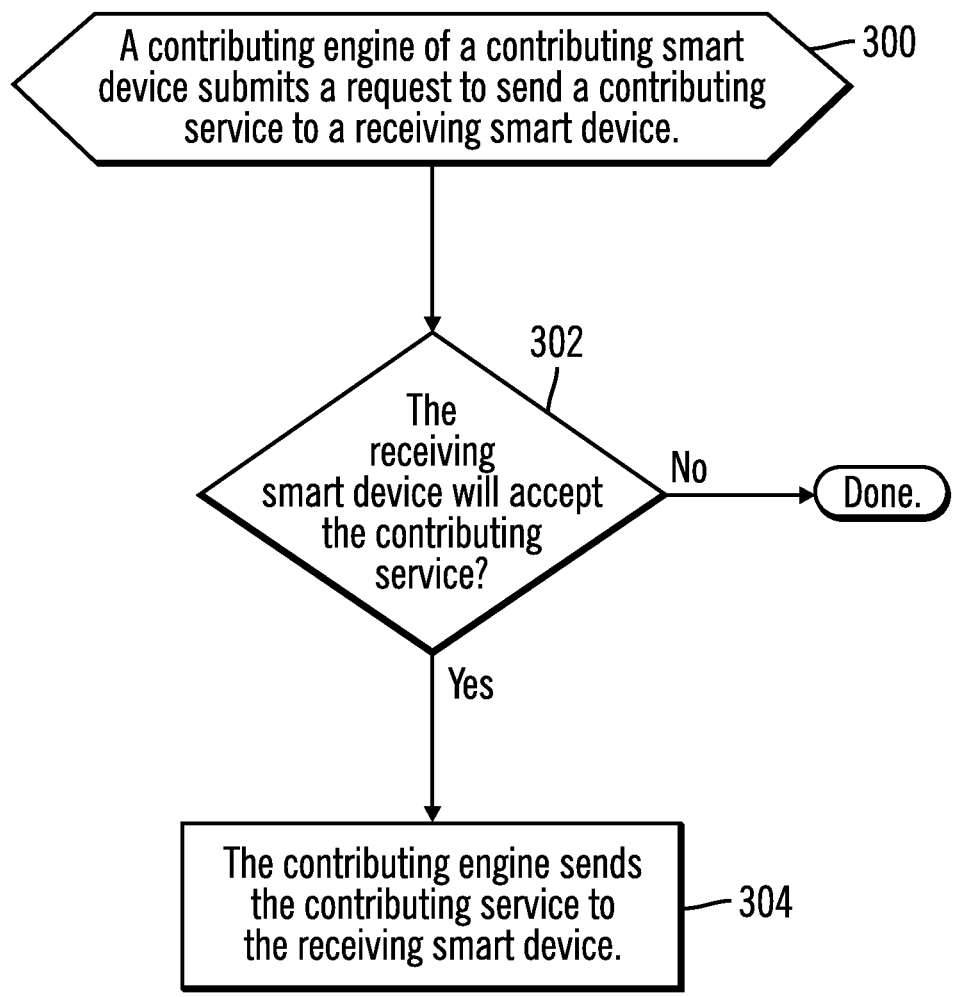
FIG. 3 illustrates, in a flowchart, operations performed by a contributing engine of a contributing smart device in accordance with certain embodiments.

FIG. 3 illustrates, in a flowchart, operations performed by a contributing engine 160a . . . 160n of a contributing smart device 150a . . . 150n in accordance with certain embodiments. Control begins at block 300 with the contributing engine 160a . . . 160n submitting a request to send a contributing service 170a . . . 170n to the receiving smart device 100. In block 302, the contributing engine 160a . . . 160n determines whether the receiving smart device 100 will accept the contributing service 170a . . . 170n. This is based on a notification (or response) received from the receiving engine 110 of the receiving smart device 100 in response to the request. If the receiving engine 110 of the receiving smart device 100 will accept the contributing service 170a . . . 170n, processing continues to block 304, otherwise, processing is done. In block 304, the contributing engine 160a . . . 160n sends the contributing service 170a . . . 170n to the receiving smart device 100. In certain embodiments, sending the contributing service 170a . . . 170n includes sending a standalone, executable package of software that includes code, runtime, system tools, system libraries, settings, data, and APIs. In other embodiments, sending the contributing service 170a . . . 170 includes sending a subset of these items, such as setting the code and data or just the code.

Figure 4:
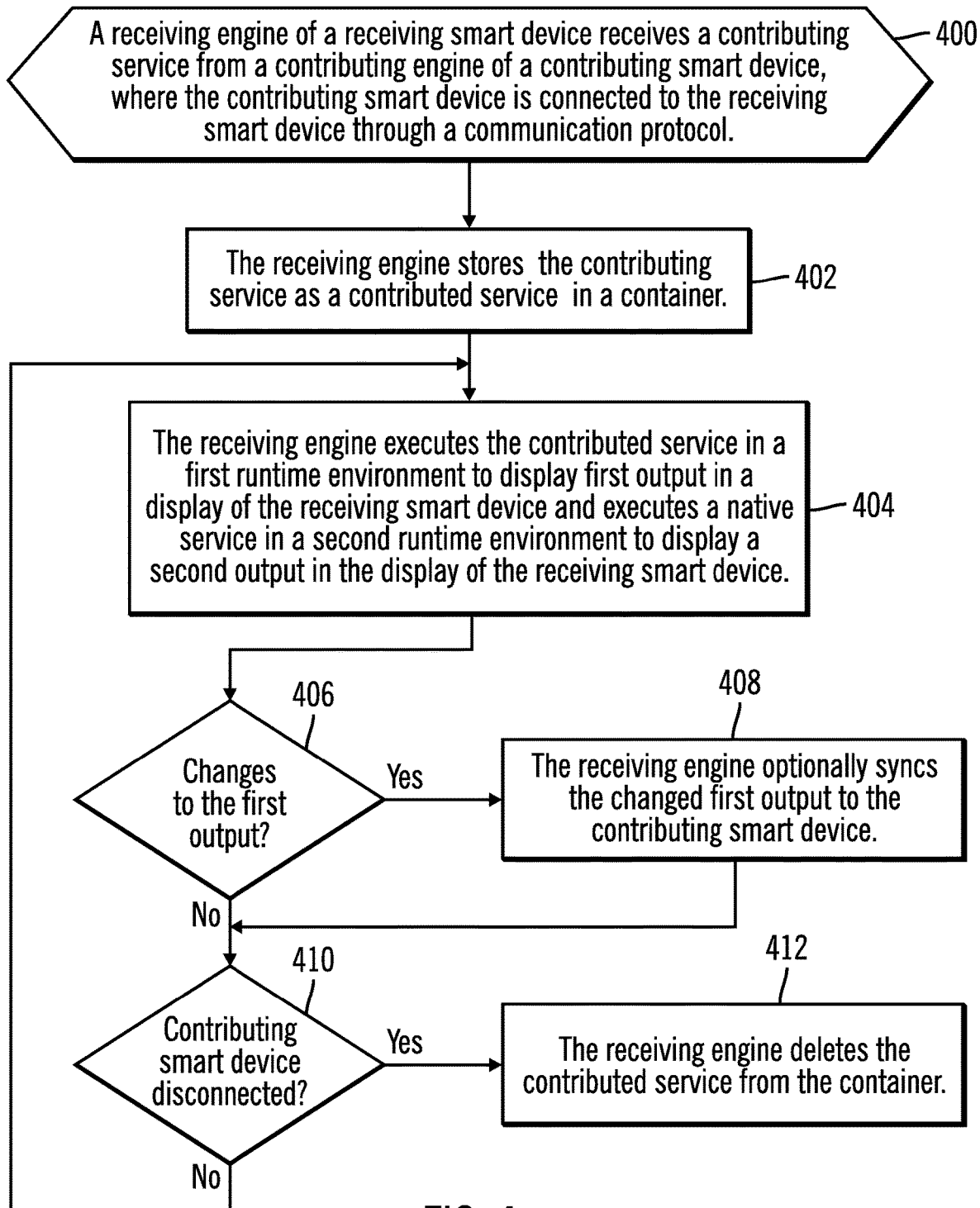
FIG. 4 illustrates, in a flowchart, operations for providing an adjusted consolidated digital experience with a native service and a contributed service in accordance with certain embodiments.

In alternative embodiments, the receiving smart device 100 detects a potential contributing smart device 150a . . . 150n and initiates communication to receive a contributing service 170a . . . 170n FIG. 4 illustrates, in a flowchart, operations for providing an adjusted consolidated digital experience with a native service and a contributed service in accordance with certain embodiments. Control begins at block 400 with the receiving engine 110 of a receiving smart device 100 receiving a contributing service 170a . . . 170n from a contributing engine 160a . . . 160n of a contributing smart device 150a . . . 150n, where the contributing smart device 150a . . . 150n is connected to the receiving smart device 100 through a communication protocol.

In block 402, the receiving engine 110, the receiving engine 110 stores the contributing service 170a . . . 170n as a contributed service 144a . . . 144n in a container 140a . . . 140n. In block 404, the receiving engine 110 executes the contributed service 144a . . . 144n in a first runtime environment to display a first output in a display 120 of the receiving smart device 100 and executes a native service 130 in a second runtime environment to display a second output in the display 120 of the receiving smart device 100.

In block 406, the receiving engine 110 determines whether there are changes to the first output. If so, processing continues to block 408, otherwise, processing continues to block 410. In block 408, the receiving engine 110 optionally syncs the changed first output to the contributing smart device 150a . . . 150n. In certain embodiments, the contributing smart device 150a . . . 150n may indicate whether the changed first output is to be synched. From block 408, processing continues to block 410.

In block 410, the receiving engine 110 determines whether the contributing smart device 150a . . . 150n has disconnected. If so, processing continues to block 412, otherwise, processing loops back to block 404 to continue executing the contributed service 144a . . . 144n. In block 412, the receiving engine 110 deletes the contributed service 144a . . . 144n from the container 140a . . . 140n. Once the contributed service 144a . . . 144n is deleted, the display 120 no longer shows the output of the deleted, contributed service 144a . . . 144n.

In certain embodiments, the receiving smart device 100 and a contributing smart device 150a . . . 150n continuously communicate through a connection (i.e., through any communication protocol), and, when that connection drops, the receiving smart device 100 (e.g., after a grace period) assumes that the contributing smart device 150a . . . 150n no longer wants to communicate (e.g., has left the area) and deletes the contributed service from the container.

Figure 5A:
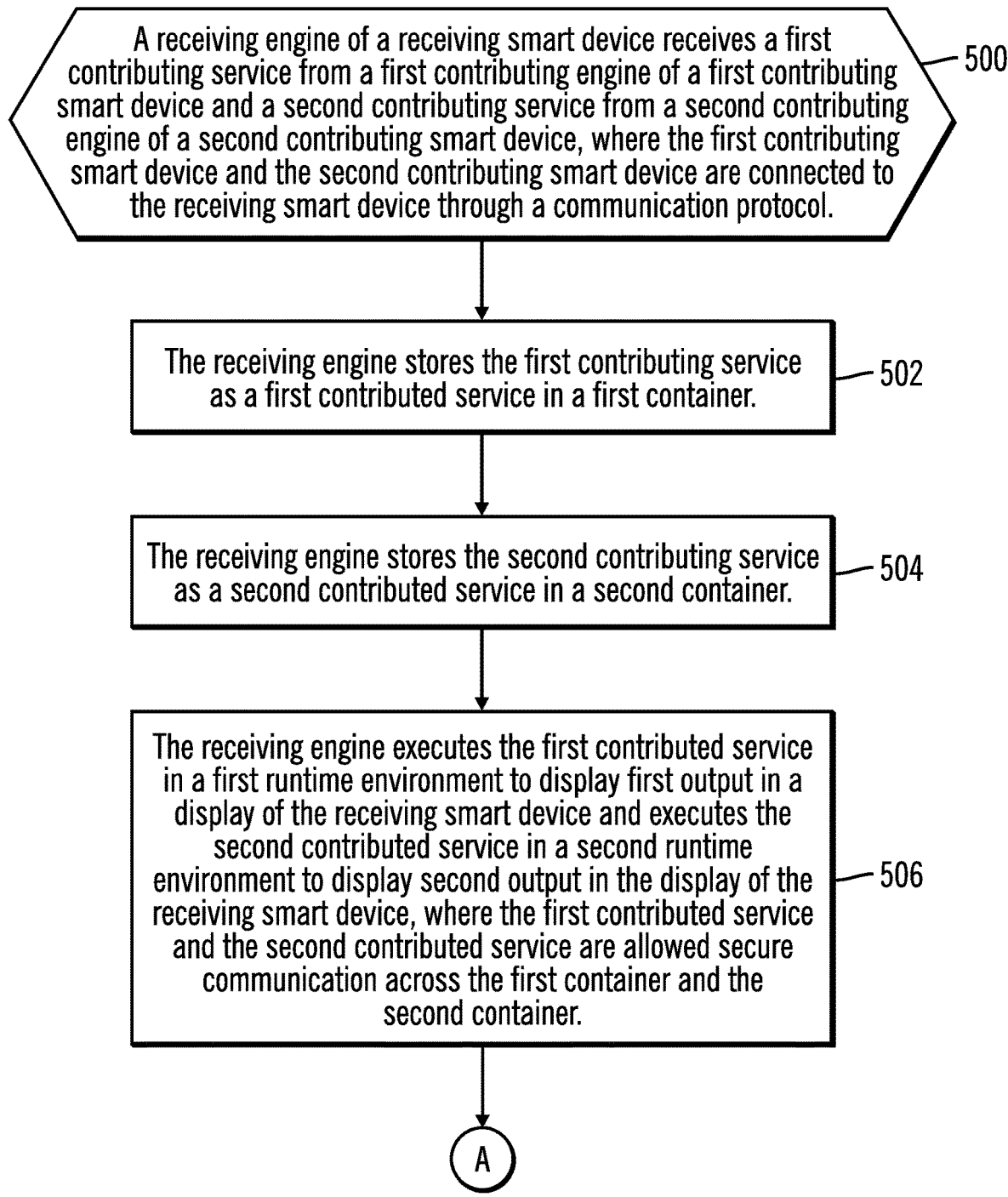
FIGS. 5A and 5B illustrate, in a flowchart, operations for providing an adjusted consolidated digital experience with a first contributed service and a second contributed service in accordance with certain embodiments.
Figure 5B:
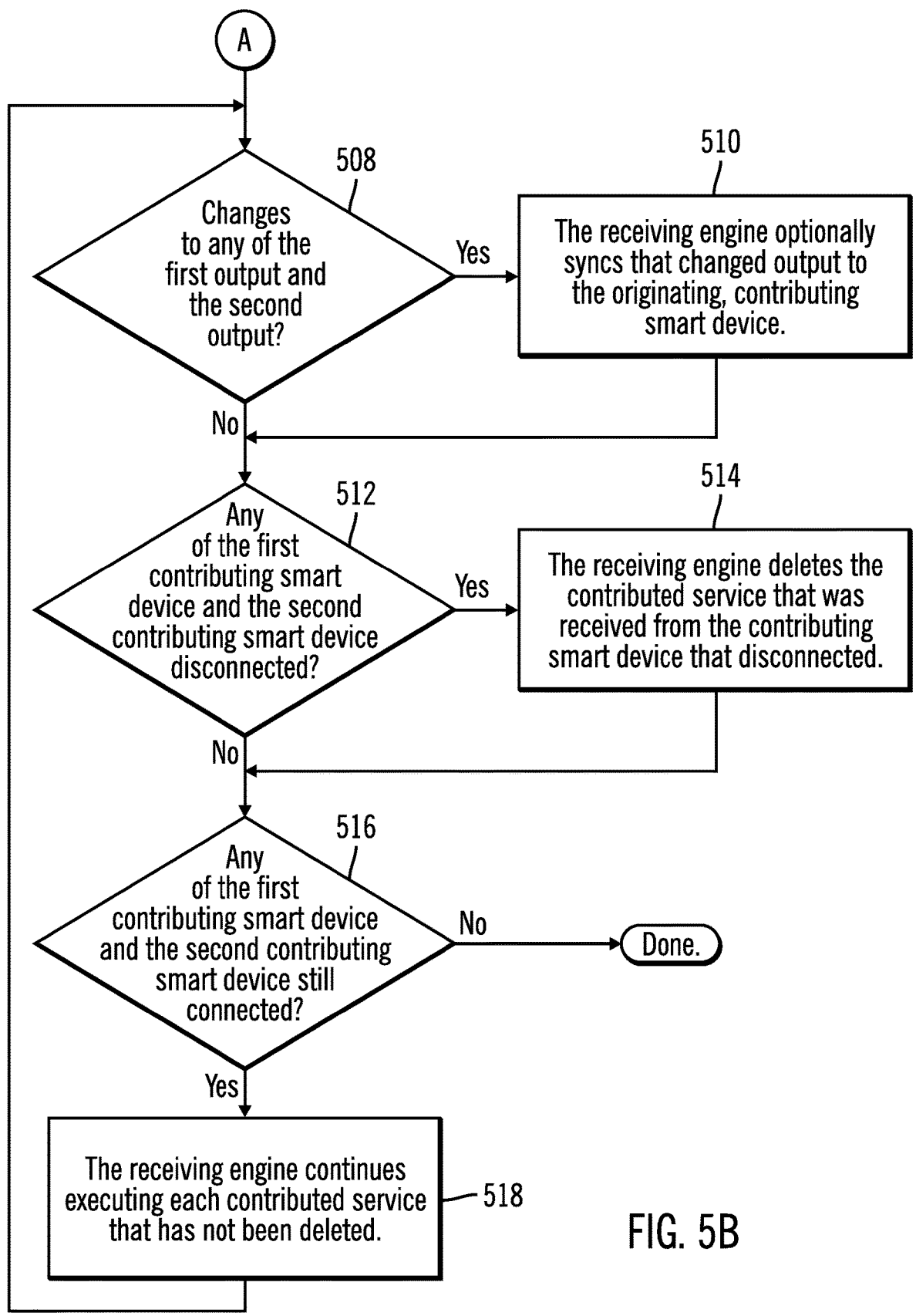

FIGS. 5A and 5B illustrate, in a flow chart, operations for providing an adjusted consolidated digital experience with a first contributed service and a second contributed service in accordance with certain embodiments. Control begins at block 500 with the receiving engine 110 of a receiving smart device 100 receiving a first contributing service (e.g., 170a) from a first contributing engine (e.g., 160a) of a first contributing smart device (e.g., 150a) and a second contributing service (e.g., 170n) from a second contributing engine (e.g., 160n) of a second contributing smart device (e.g., 150n), where the first contributing smart device and the second contributing smart device are connected to the receiving smart device through one or more communication protocols.

In block 502, the receiving engine 110 stores the first contributing service as a first contributed service in a first container. In block 504, the receiving engine 110 stores the second contributing service as a second contributed service in a second container.

In block 506, the receiving engine 110 executes the first contributed service in a first runtime environment to display a first output in a display 120 of the receiving smart device 100 and executes the second contributed service in a second runtime environment to display a second output in the display 120 of the receiving smart device 100, where the first contributed service and the second contributed service are allowed secure communication across the first container and the second container. From block 506 (FIG. 5A), processing continues to block 508 (FIG. 5B).

In certain embodiments, the receiving engine 110 also executes the native service 130 and displays third output in the display.

In block 508, the receiving engine 110 determines whether there are changes to any of the first output and the second output. If so, processing continues to block 510, otherwise, processing continues to block 512. In block 510, the receiving engine 110 optionally syncs that changed output to the originating, contributing smart device. That is, if there are changes are to the first output, the changes may be synched to the first contributing smart device, and, if there are changes to the second output, the changes may be synched to the second contributing smart device. In certain embodiments, the contributing smart device 150a . . . 150n may indicate whether the changed output is to be synched. From block 510, processing continues to block 512.

In block 512, the receiving engine 110 determines whether any of the first contributing smart device and the second contributing smart device have disconnected. If so, processing continues to block 514, otherwise, processing continues to block 516. In block 514, the receiving engine 110 deletes the contributed service that was received from the contributing smart device that disconnected and processing continues to block 516. That is, if the first contributing smart device disconnected, the first contributed service is deleted from the first container; and, if the second contributing smart device disconnected, the second contributed service is deleted from the second container. With embodiments, one or both of the contributing smart devices may disconnect at any time. Once the contributed service is deleted, the display 120 no longer shows the output of the deleted, contributed service. From block 514, processing continues to block 516.

In block 516, the receiving engine 110 determines whether any of the first contributing smart device and the second contributing smart device are still connected. If so, processing continues to block 518, otherwise, processing is done.

In block 518, the receiving engine 110 continues executing each contributed service that has not been deleted. From block 518, processing continues to block 508.

Certain embodiments enable an adjusted consolidated digital experience in built-in devices (e.g., whiteboards or smart dashboards) with applications (e.g., coming from different users) interacting within a shared secure remote runtime environment provided by the built-in device. The built-in device offers secure container runtime environment to execute applications contributed by different contributing smart devices. The built-in device offers a number of containers. Contributing smart devices may contribute the applications to be installed in those containers. The built-in device may accept or reject requests from contributing devices to contributed applications. These containers provide isolation and security. The containers are not allowed to access data and/or APIs of their neighboring containers. Instead, cross container communication is performed by a secure eventing mechanism. The applications may be loaded into these shared containers of the shared built-in device by multiple contributing smart devices.

Certain embodiments enable running a service in a target system (a receiving smart device 100) with a runtime environment by: recognizing a contributing smart device (e.g., a mobile device), recognizing a contributing service running on contributing smart device, automatically receiving the contributing service from the contributing smart device, installing the contributing service as a contributed service in a first container, running the contributed service in the runtime environment, and providing a communication channel for exchanging events between the contributed service and another contributed service running in a second container.

In an example scenario, a vehicle software service runtime environment allows automatic deployment of additional, contributing services when passengers enter the car. The contributing services may be advertised by the smart phone of the passenger. The vehicle software service detects the contributing services and automatically deploys those contributing services as contributed services into the vehicle software service runtime environment. The contributed services may interact with each other and the native services (e.g. the car entertainment system) by exchanging events (such as geolocation, time, and playlists). Each deployed, contributed service is running in a secure sandbox provided by the vehicle service runtime environment to prevent unintended functions or side effects. The contributed services are automatically removed (e.g., as soon as the passenger leaves the vehicle).

Figure 6:
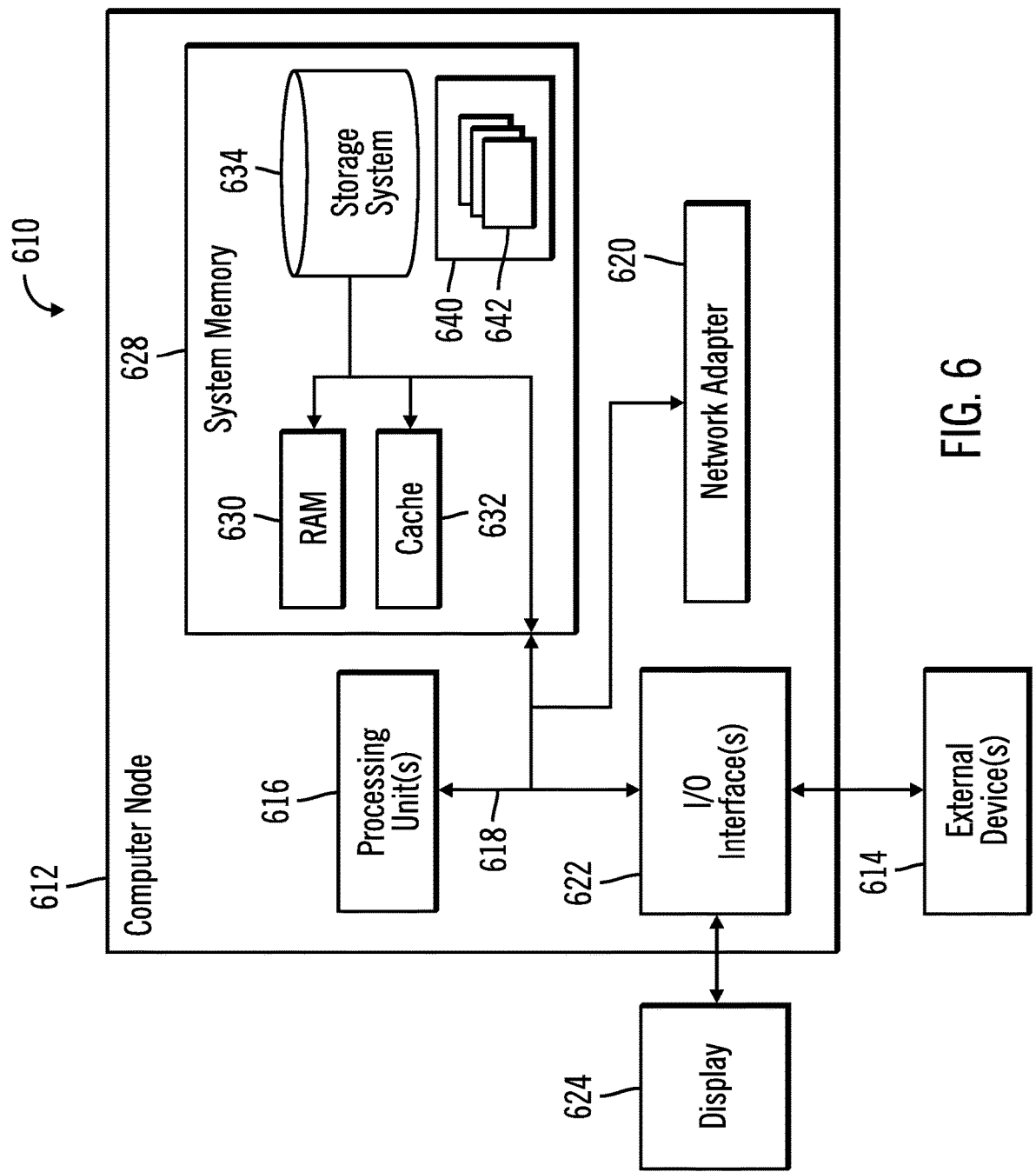
FIG. 6 illustrates a computing node in accordance with certain embodiments.

FIG. 6 illustrates a computing environment 610 in accordance with certain embodiments. Referring to FIG. 6, computer node 612 is only one example of a suitable computing node and is not intended to suggest any limitation as to the scope of use or functionality of embodiments of the invention described herein. Regardless, computer node 612 is capable of being implemented and/or performing any of the functionality set forth hereinabove.

The computer node 612 may be a computer system, which is operational with numerous other general purpose or special purpose computing system environments or configurations. Examples of well-known computing systems, environments, and/or configurations that may be suitable for use with computer node 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 612 may be described in the general context of computer system executable instructions, such as program modules, being executed by a computer system. Generally, program modules may include routines, programs, objects, components, logic, data structures, and so on that perform particular tasks or implement particular abstract data types. Computer node 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer node 612 is shown in the form of a general-purpose computing device. The components of computer node 612 may include, but are not limited to, one or more processors or processing units 616, a system memory 628, and a bus 618 that couples various system components including system memory 628 to one or more processors or processing units 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 612 typically includes a variety of computer system readable media. Such media may be any available media that is accessible by computer node 612, and it includes both volatile and non-volatile media, removable and non-removable media.

System memory 628 can include computer system readable media in the form of volatile memory, such as random access memory (RAM) 630 and/or cache memory 632. Computer node 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, system memory 628 may include at least one program product having a set (e.g., at least one) of program modules that are configured to carry out the functions of embodiments of the invention.

Program/utility 640, having a set (at least one) of program modules 642, may be stored in system memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer node 612 may also communicate with one or more external devices 614 such as a keyboard, a pointing device, a display 624, etc.; one or more devices that enable a user to interact with computer node 612; and/or any devices (e.g., network card, modem, etc.) that enable computer node 612 to communicate with one or more other computing devices. Such communication can occur via Input/Output (I/O) interfaces 622. Still yet, computer node 612 can communicate with one or more networks such as a local area network (LAN), a general wide area network (WAN), and/or a public network (e.g., the Internet) via network adapter 620. As depicted, network adapter 620 communicates with the other components of computer node 612 via bus 618. It should be understood that although not shown, other hardware and/or software components could be used in conjunction with computer node 612. Examples, include, but are not limited to: microcode, device drivers, redundant processing units, external disk drive arrays, RAID systems, tape drives, and data archival storage systems, etc.

In certain embodiments, the receiving smart device 100 and each contributing smart device 150*a* . . . 150*n* has the architecture of computer node 612.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended.

The foregoing description provides examples of embodiments of the invention, and variations and substitutions may be made in other embodiments.

What is claimed is:

1. A computer-implemented method, comprising:
   receiving, at a receiving smart device, a request to accept a contributing service from a contributing smart device;
   in response to determining to accept the contributing service, installing the contributing service as a first contributed service in a first container at the receiving smart device, wherein the first container comprises the first contributed service and provides a first runtime environment;
   installing a second contributed service in a second container at the receiving smart device, wherein the first container is not allowed to access code and data of the second container, and wherein the second container is not allowed to access code and data of the first container;
   executing the first contributed service in the first runtime environment of the first container to display a first output on a display;
   executing a native service in a second runtime environment to display a second output on the display; and
   executing the second contributed service in a third runtime environment of the second container to display a third output on the display.

2. The computer-implemented method of claim 1, further comprising:
   in response to determining that the first output has changed, synching the first output with the contributing smart device.

3. The computer-implemented method of claim 1, further comprising:
   in response to determining that the contributing smart device has disconnected, deleting the first contributed service from the first container.

4. The computer-implemented method of claim 1, further comprising:
   in response to determining not to accept the contributing service, sending a notification to the contributing smart device.

5. The computer-implemented method of claim 1, wherein a communication channel allows for secure communication between the first contributed service in the first container and the second contributed service in the second container, and wherein the first contributed service communicates with the second contributed service by exchanging events using the communication channel.

6. The computer-implemented method of claim 1, wherein the display is part of the receiving smart device, and wherein the receiving smart device is one of a smart dashboard of a vehicle and a smart whiteboard.

7. A computer program product, the computer program product comprising a computer readable storage medium having program code embodied therewith, the program code executable by at least one processor to perform operations for:
  receiving, at a receiving smart device, a request to accept a contributing service from a contributing smart device;
  in response to determining to accept the contributing service, installing the contributing service as a first contributed service in a first container at the receiving smart device, wherein the first container comprises the first contributed service and provides a first runtime environment;
  installing a second contributed service in a second container at the receiving smart device, wherein the first container is not allowed to access code and data of the second container, and wherein the second container is not allowed to access code and data of the first container;
  executing the first contributed service in the first runtime environment of the first container to display a first output on a display;
  executing a native service in a second runtime environment to display a second output on the display; and
  executing the second contributed service in a third runtime environment of the second container to display a third output on the display.

8. The computer program product of claim 7, wherein the program code is executable by the at least one processor to perform further operations for:
  in response to determining that the first output has changed, synching the first output with the contributing smart device.

9. The computer program product of claim 7, wherein the program code is executable by the at least one processor to perform further operations for:
  in response to determining that the contributing smart device has disconnected, deleting the first contributed service from the first container.

10. The computer program product of claim 7, wherein the program code is executable by the at least one processor to perform further operations for:
  in response to determining not to accept the contributing service, sending a notification to the contributing smart device.

11. The computer program product of claim 7, wherein a communication channel allows for secure communication between the first contributed service in the first container and the second contributed service in the second container, and wherein the first contributed service communicates with the second contributed service by exchanging events using the communication channel.

12. The computer program product of claim 7, wherein the display is part of the receiving smart device, and wherein the receiving smart device is one of a smart dashboard of a vehicle and a smart whiteboard.

13. A computer system, comprising:
  one or more processors, one or more computer-readable memories and one or more computer-readable, tangible storage devices; and
  program instructions, stored on at least one of the one or more computer-readable, tangible storage devices for execution by at least one of the one or more processors via at least one of the one or more computer-readable memories, to perform operations comprising:
  receiving, at a receiving smart device, a request to accept a contributing service from a contributing smart device;
  in response to determining to accept the contributing service, installing the contributing service as a first contributed service in a first container at the receiving smart device, wherein the first container comprises the first contributed service and provides a first runtime environment;
  installing a second contributed service in a second container at the receiving smart device, wherein the first container is not allowed to access code and data of the second container, and wherein the second container is not allowed to access code and data of the first container;
  executing the first contributed service in the first runtime environment of the first container to display a first output on a display;
  executing a native service in a second runtime environment to display a second output on the display; and
  executing the second contributed service in a third runtime environment of the second container to display a third output on the display.

14. The computer system of claim 13, wherein the operations further comprise:
  in response to determining that the first output has changed, synching the first output with the contributing smart device.

15. The computer system of claim 13, wherein the operations further comprise:
  in response to determining that the contributing smart device has disconnected, deleting the first contributed service from the first container.

16. The computer system of claim 13, wherein the operations further comprise:
  in response to determining not to accept the contributing service, sending a notification to the contributing smart device.

17. The computer system of claim 13, wherein a communication channel allows for secure communication between the first contributed service in the first container and the second contributed service in the second container, and wherein the first contributed service communicates with the second contributed service by exchanging events using the communication channel.

18. The computer system of claim 13, wherein the display is part of the receiving smart device, and wherein the receiving smart device is one of a smart dashboard of a vehicle and a smart whiteboard.

19. The computer-implemented method of claim 1, wherein the first contributed service comprises a subset of functionality of the contributing service.

20. The computer program product of claim 7, wherein the first contributed service comprises a subset of functionality of the contributing service.

* * * * *